United States Patent [19]

Conway

[11] 4,060,915
[45] Dec. 6, 1977

[54] MENTAL IMAGE ENHANCEMENT APPARATUS UTILIZING COMPUTER SYSTEMS

[76] Inventor: Malcolm J. Conway, Main Road, Gill, Mass.

[21] Appl. No.: 710,808

[22] Filed: Aug. 2, 1976

[51] Int. Cl.² .............................................. G09B 7/04
[52] U.S. Cl. ...................................... 35/9 A
[58] Field of Search .............. 35/22 R, 8 R, 8 A, 9 R, 35/9 A

[56] References Cited

U.S. PATENT DOCUMENTS

| | | | |
|---|---|---|---|
| 3,277,588 | 10/1966 | Lynott et al. | 35/9 A |
| 3,483,302 | 12/1969 | Ashkenas et al. | 35/22 R X |
| 3,613,266 | 10/1971 | Conway | 35/22 R |
| 3,718,759 | 2/1973 | Reiffel | 35/9 A X |
| 3,718,986 | 3/1973 | Hewitt | 35/9 A |

Primary Examiner—William H. Grieb

[57] ABSTRACT

A method and apparatus for enhancing mental images of data in various visual environments utilizes an electronically generated visual display of an environment including datum references to be acted upon by the subject and means which may be manipulated by the subject to electrically record an action taken by him to change a datum reference of the visual display. His action using the manipulatable means in response to the instruction is electrically recorded invisibly to him. Thereafter, there is presented for comparison an electrically generated visual display including the datum reference as changed by the correct response to the given instruction and the visual display of that reference as changed by his action. The method and apparatus may utilize concurrently an auditory environment corresponding to the visual environment and the actions taken by the subject may effect concurrent change in the visual and/or auditory environments.

37 Claims, 6 Drawing Figures

MENTAL IMAGE ENHANCEMENT APPARATUS UTILIZING COMPUTER SYSTEMS

BACKGROUND OF THE INVENTION

In United States Letters Patent No. 3,613,266, granted Oct. 19, 1971, there are disclosed a method for enhancing the ability of individuals to form clear mental images of relatively complex data indicative of environments in which they may be called upon to perform tasks. By utilization of the methods and apparatus disclosed in this patent, an individual may be rapidly trained to react accurately to various situations which he may encounter in an actual working environment and other individuals may be maintained at high performance levels through avoiding skill degradation during periods of relative inactivity with respect to a given environment.

Although the method and apparatus of the aforementioned patent have enjoyed substantial acceptance, the need for printed or otherwise reproduced documents indicative of a given environment and prerecorded documents evidencing the correct response for comparison with the subject's response has limited the application of the concept to single or simple sequences of instructions and responsive actions. The limitation of such a documentary approach has presented problems from the standpoint of storage of the information and evaluation of the subject's progress over a period of time. Similarly, the documentary approach has not enabled a dynamic situation to be presented to the subject requiring instantaneous or consecutive acts in response to a given instruction or series of instructions.

It is an object of the present invention to provide a novel method and apparatus for enhancing an individual's capacity to develop accurate mental images of data by use of rapid acting and variable electrical equipment for generating a visual display of an environment and for recording the action of the subject to alter data within that environment and thereafter presenting to the subject images of the data as correctly changed and as changed by his action.

It is also an object to provide such a method and apparatus wherein there is provided concurrently an auditory environment corresponding to the visual environment.

Another object is to provide such a method and apparatus in which the visual display and/or the auditory environment are altered concurrently with action of the subject in response to an instruction.

A further object is to provide such a method and apparatus in which the visual image is changed a plurality of times in a concurrent sequential excercise and the series of actions by the subject are recorded in response to instructions with respect to the changing images for subsequent presentation and comparison.

SUMMARY OF THE INVENTION

It has now been found that the foregoing and related objects may be readily attained by a method in which there are provided to the subject an electrically generated display of an environment including a plurality of datum references which may be acted upon by him and means for manipulation by him to electrically record his action to change at least one of the datum references of the visual display. He is then provided an instruction requiring an action with the manipulatable means to change at least one of the datum references, and his action in response to the instruction is electrically recorded in a manner invisible to him. Thereafter, there is presented to the subject for comparison an electrically generated visual display including the one datum reference as changed by the correct response to the instruction and as changed by the electrically recorded action which he took.

In accordance with the present invention, the electrically generated visual display may comprise an electronic display upon a cathode ray tube, a photographic projection upon a screen, or an image generated by electrical stimulation of chemical compounds. When a cathode ray tube is employed, the manipulatable means may be a light pen cooperating with the cathode ray tube and with suitable recordation means responsive to incidence of the light from the light pen upon the cathode ray tube. The manipulatable means may also comprise a tablet and signal generating stylus means cooperating with the tablet, a keyboard coupled to the recording means or a physically movable device simulating an operating instrument in the environment.

In accordance with one embodiment of the present invention, an auditory environment may be provided which corresponds to the visual environment of the visual display. Moreover, action of the subject in response to the instruction may effect an alteration of the auditory environment and/or the visual environment.

If so desired, the method may involve a sequenced plurality of instructions accompanied by concurrent changes in at least one of the datum references in the visual display, and such changes to the visual display may be indicative of the correct response or the subject's response. In the preferred embodiment of the invention, computer means has stored therein data relating to a multiplicity of visual displays of environments and the response of the subject to the instruction is recorded in the memory of the computer means for subsequent presentation of the comparison visual images. The computer means in turn is coupled to a display processor including visual displays of the multiplicity of environments. In the practice of the process, the instructor selects the desired visual display of the environment to be acted upon and this visual display is generated by the visual display generating means and the subject's action in response to the instruction is electronically recorded in the computer means which threafter causes the display means to exhibit both the image of the correct response and the image resulting from the subject's response.

DETAILED DESCRIPTION OF THE ILLUSTRATED EMBODIMENTS

As has been indicated hereinafter, the present invention advances the state of the art reflected by Conway United States Letters Patent No. 3,613,266 by coupling of its valid basic concepts with rapid acting electrical and electronic mechanisms to provide a wide variety of possible visual environments and/or auditory environments and the means to record electrically and invisibly the action taken by the subject and thereafter to bring a visual display of the change effected by his action together with a visual display of the change produced by the correct action. As will be readily appreciated, the present invention is adapted to use of computers and various sophisticated electronic instrumentation for display of the images and/or manipulation by the subject so as to record his action to alter the image.

Figure 1:
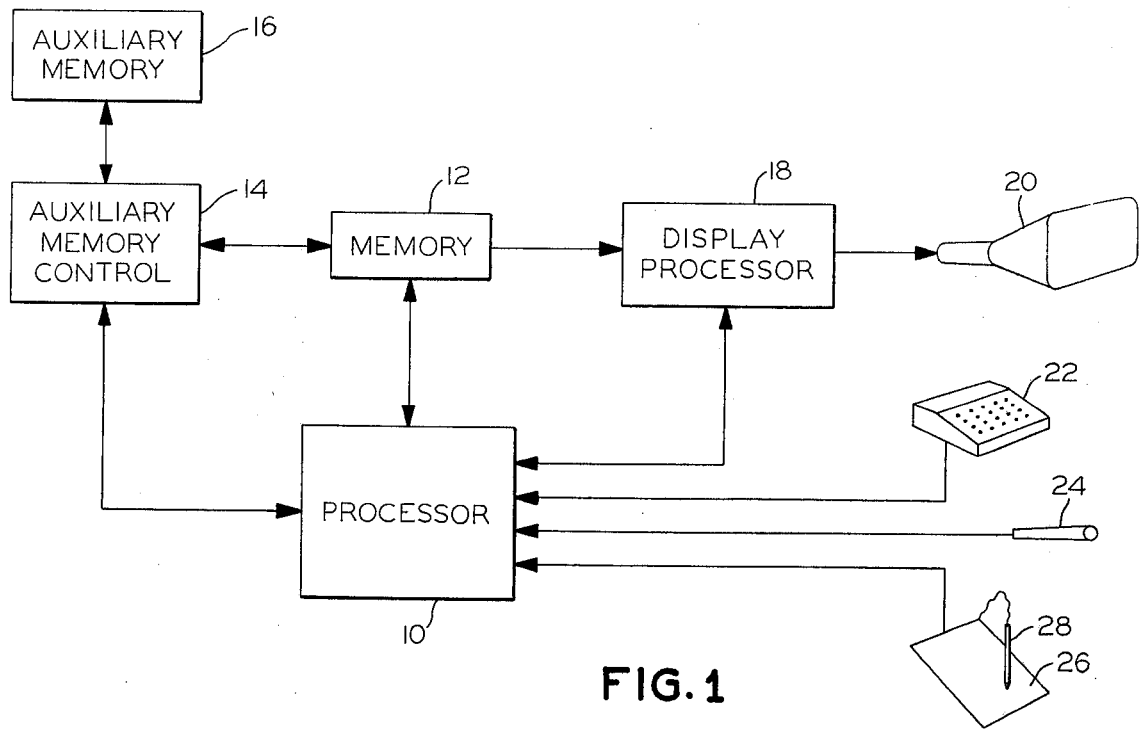
FIG. 1 is a diagrammatic illustration of apparatus embodying the present invention.

Turning now to FIG. 1 of the attached drawings, there is illustrated diagramatically one form of apparatus for practice of the present invention. A computer has a module 10 designated "processor" containing high speed registers and an arithmetic unit plus a control unit capable of interpreting encoded instructions. The computer has a second module 12 designated "memory" and which contains stored data relative to a multiplicity of visual environments which may be presented to subjects undergoing training. In accordance with conventional computer design, the memory module 12 has the data stored therein and will retrieve specific data in response to signals generated by the processor module 10 or by other components of the apparatus as will be described more in detail hereinafter.

In the illustrated apparatus, the same computer or a separate computer includes a module 14 designated "auxiliary memory control" and a module 16 designated "auxiliary memory". The modules 14 and 16 function to provide additional elements of memory for data which may be only temporarily retained or which may be transferred into the memory module 12 upon demand or after desired processing. As indicated, the auxiliary memory control module 14 receives its control directions from the main processor module 10 and directly or indirectly as a stored program is being executed. This form of auxiliary memory modules is advantageous in providing relatively low cost bulk storage of programs and data which are not used frequently and which therefore need not be retained in the more expensive high speed memory module 12.

The module 18 designates "display processor" is designed to generate a multiplicity of prerecorded stored visual images of environments containing datum references to which the subject is to be exposed and is to react. The processor 18 may comprise an electronic storage or conversion apparatus, or it may comprise a photographic storage mechanism or other suitable means for generating the desired visual image of an environment. More particularly, videotape, photographic slides and movie film and magnetic images may all be stored and utilized in the display processor 18 as the source of the visual images, or the memory module 12 may have stored therein electronic data convertible in the display processor 18 to generate a desired visual image on the cathode ray display device 20.

In the diagrammatic illustration of FIG. 1, three alternative means are shown and manipulatable by the subject as he acts to change a datum reference of the environment of the display and they are coupled directly or indirectly to the processor module 10 so that his action is recorded electrically in the computer, most usually in the memory module 12. The device 22 comprises a keyboard containing suitably coded keys which may be pressed by the subject to record the changes which he would make to the datum reference of the visual display.

The device 24 comprises a light pen of the type conventionally employed in connection with cathode ray tube display devices. The subject points the light pen 24 to portions of the visual display and the sensitivity of the light pen 24 to the light in the display indicates the portion of the display upon which the subject is attempting to act. A record of his action on the visual display is thus made by the computer processor 10.

The other device comprises a tablet 26 and stylus or pen 28 of the type commonly known as RAND tablet. Here the subject draws lines on the tablet as if he were drawing upon conventional paper and the movement of the pen 28 relative to the tablet 26 generates signals which are recorded through the processor 10.

Figure 2:
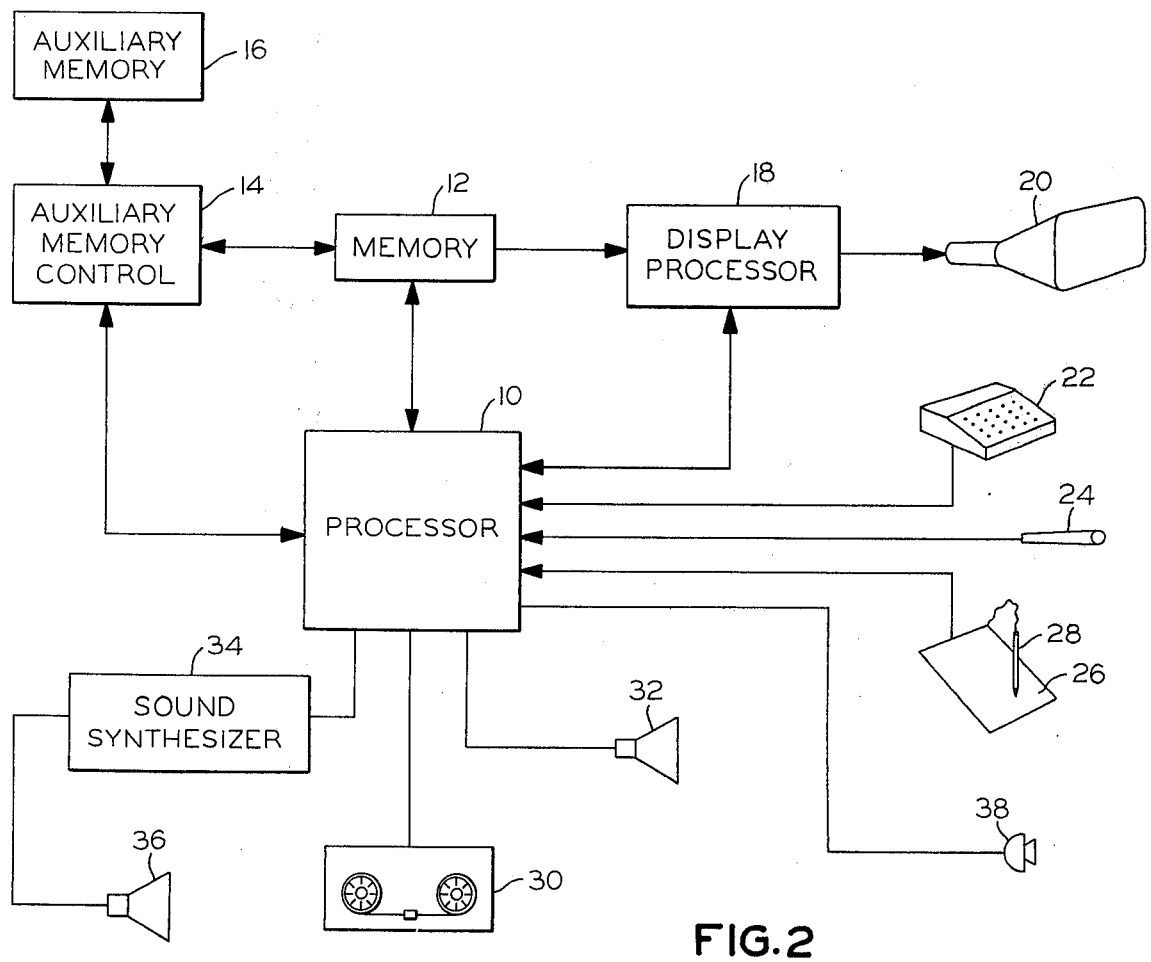
FIG. 2 is a similar diagrammatic illustration of such an apparatus additionally including means for generating an auditory environment cooperating with the visual environment and for recording an auditory response of the subject.

In the embodiment of FIG. 2, the apparatus is augmented by means for providing an auditory environment and for recording an auditory response thereto. More particularly, there are coupled to the processor module 10 a tape recorder deck 30 or the like and a speaker 32, and a sound synthesizer 34 and its cooperating speaker 36. Upon signal from the processor module 10, either the tape deck 30 or the sound synthesizer 34 may provide a desired auditory environment cooperating with that environment visually displayed by action of the display processor 18 upon the cathode ray tube 20. In this embodiment, a verbal or other auditory response of the subject may be captured by the microphone 38 and recorded by the processor module 10.

In operation of the apparatus of FIGS. 1 and 2, the data concerning the environment for simulation of a learning experience is encoded and stored in the memory of the apparatus which may be the primary memory module 12 or the auxiliary memory 16. A graphic display program for execution by the display processor 18 to produce a visual image of the environment on the cathode ray tube 20 is stored in the processor module 10. If so desired, the program in the processor 10 may include an auditory environment program which will actuate the tape deck 30 or sound synthesizer 34.

Upon activation, the processor 10 causes the display processor 18 to produce the desired visual image of the learning environment on the cathode ray tube 20 and, if so programmed, an auditory environment through either one of the tape deck 30 or sound synthesizer 34. As the subject reacts with the input device or selected manipulatable means 22,24,28, the action taken by him is recorded electronically through the program in the processor 10 in either the memory module 12 or auxiliary memory module 16. If so established, the processor 10 may then present a modified visual image reflecting either the action taken by the subject and now recorded or a display of the environment as it would have been altered by the correct action taken. The subject then executes what he considers to be the proper steps to alter a datum reference of this visual image using any one of the means 22,24,28, and that action in turn recorded in one of the memory modules 12,16 through action of the processor module 10. It will be appreciated that a large number of sequential steps of environment change and invisible recording of subject action may thus take place.

When an auditory environment is also provided as in the environment of FIG. 2, any verbal or auditory response by the subject may be recorded through the processor module 10 and the auditory environment may be varied to reflect the result of the correct action which should have been taken by the subject or the actual action which he may have taken.

Following completion of the training exercise, the computer processor 10 draws from the memory module 12 or 16, the data concerning the appropriate change to the datum reference of the visual image as well as the data concerning the change effected to that datum reference by the action of the subject. Through action of the display processor 18, images of the datum reference as changed by the subject and as properly changed in response to the instruction are displayed on the screen of the cathode ray tube 20 for comparison evaluation. Such images may be presented side-by-side. When a series of sequenced instructions and reactive changes have been employed, then the computer processor 10 may sequentially display the appropriate comparison visual images of the changed datum reference. If so desired, the computer processor 10 may draw upon the memory modules 12 and 16 to provide a more comprehensive analysis of the subject's response such as time for reaction, evaluation of the action taken within a series of possible elective actions, and overall response to the sequence of instructions. The computer processor 10 desirably records either graphically or electronically the subject's actions with respect to changes in the visual image.

In addition, during the comparison display of the visual images of the datum reference, the subject may be provided with graphic or auditory information to assist him in better evaluating the deficiencies in any response which he had made or in providing quantitive measures of the correct image and of his graphical reconstruction of the image.

As will be readily appreciated from the foregoing description, the digital computer executes one or more programs controlling the operations of the system, and these programs are generally step-by-step descriptions of algorithmic processes which may be executed by the computer processor 10, display processor 18, and auxiliary memory control 14. These steps may be encoded into language which is interpreted by the computer directly or which can be automatically translated into the language of the computer by another program. In accordance with conventional practice, suitable languages for description of algorithms for the computer include FORTRAN and the manufacturer's assembly language for the particular computer utilized.

The algorithms for generating a graphic or visual display are well known as are the algorithms for controlling graphic input devices. The algorithms for encoding an environment and for describing or producing a sequence of changes are a subset of the algorithms presently used for manipulating and displaying a graphic data base. The data for creating a graphic environment may also be stored in the memory modules 12,16 of the computer or provided in the graphic storage assembly of the display processor 18 as has been previously indicated. The algorithms for analyzing and evaluating the subject's response to a specific instruction will, of course, be specific to the particular training program and will be derived in part from the algorithms of the basic datum reference.

In addition to the cathode ray display device 20 which has been specifically illustrated, it will be appreciated that other suitable devices for presenting a visual display of the environment may be utilized. For example, a projector and screen may be employed, and the visual images may be recorded as slide strips or as movie film which are selected and/or advanced at the desired rate, or under contol of the computer, or manually by the instrutor. Other types of devices for producing a photographic display may also be employed.

In addition to the manipulatable means specifically illustrated in FIGS. 1 and 2, other types of devices may be employed. For example, the subject may be provided with an instrument which he would normally manipulate in the environment for which he is being trained, such as the joy stick and a throttle lever of an aircraft, or a control lever for some form of processing apparatus. A stylus of the type known as a "mouse" or a "SRI-mouse" which generates a signal indicative of movement from an initial starting point may also be conveniently employed. Various embodiments of styli which cooperate with electrical, electronic or magnetic means to indicate movement are the type most conveniently employed.

Figure 3:
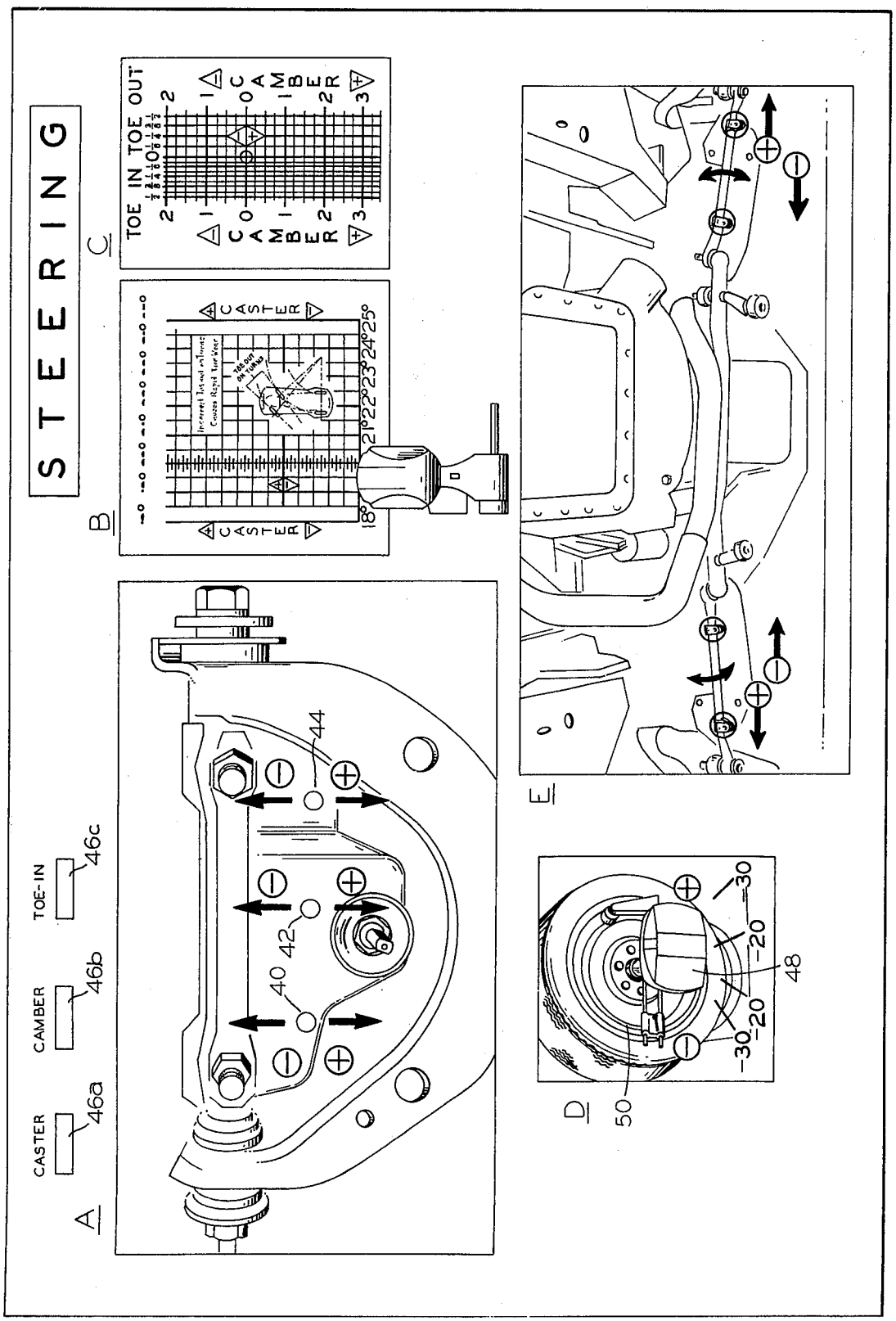
FIG. 3 is an illustration of a visual display of an environment relating to automotive repair and including datum references as to which action may be taken by the subject.

Turning now to FIG. 3, there is illustrated a visual display of an environment relating to wheel alignment of an automobile. The instrumentation in part depicted is suitable for measuring the caster, camber and toe-in and toe-out of an automobile front end suspension, and the illustrations include the measuring apparatus and the adjustment points on the suspension system. In a training exercise utilizing this visual environment, the nominal task of the subject will be to indicate how he would adjust the suspension system and to indicate the measurements on the measuring apparatus that should result from the adjustments which he has made.

In Subfigure A, the three principal adjustment points 40,42,44 for camber and caster are shown and there are also provided boxes 46a,b,c for indicating specific parameters for caster, camber and toe-in for a particular adjustment. These parameters are stored in the computer and are displayed to the subject. In Subfigure B is provided the caster measurement scale, and Subfigure C provides the measurement scale for toe-in and toe-out and camber. Subfigure D illustrates the device 48 which is attached to the automobile wheel 50 to take the several measurements and Subfigure E shows the adjustment process for toe-in and toe-out.

The data for the datum references are stored in computer memory, and the computer memory may also contain the data necessary to generate the graphic displays or suitable photographic images may be stored in the display processor for selection and display in response to the computer program. The desired parameters for the adjustment of the camber, caster and toe-in are also stored in computer memory and are displayed to the subject at the indicated boxes in Subfigure A. Concurrently there are displayed to the subject the measurements then prevailing in the front wheel suspension by dots or the like on the appropriate scale of Subfigures B and C.

The subject responds to this information by identifying those parameters requiring adjustment and selecting one of those parameters to adjust. He indicates the adjustment he would make in either of Subfigures 3A or 3E by drawing his stylus in a line (not shown) to indicate the direction of movement of the adjustment which he would make and by indicating in Subfigures B or C the point on the scale that would indicate the reading after this adjustment has been made. These lines are not visibly recorded since he is using stylus means to generate an electrical or electronic signal captured in the computer through the processor module.

After the desired sequence of instructions has been completed, the computer then presents on Subfigures A and/or E and B and/or C the datum reference or references as changed by the action of the subject and as they should have been changed if the correct action had been taken in the event that the latter is different. Conveniently, when using the same visual display of the datum reference, i.e., a composite image of the type shown in FIG. 3, differenct colors are employed for the two "changed" images being displayed for comparison.

It should be noted that the instructional program of this embodiment allows the subject to indicate symbolically that adjustment point or those points which he will use, the direction in which he would make the adjustment, the approximate amount of adjustment and the resulting change in the suspension system. All of this information resulting from the subject's response may be recorded quantitatively and compared to the appropriate correct response at the time of the presentation of the comparison display.

Figure 4:
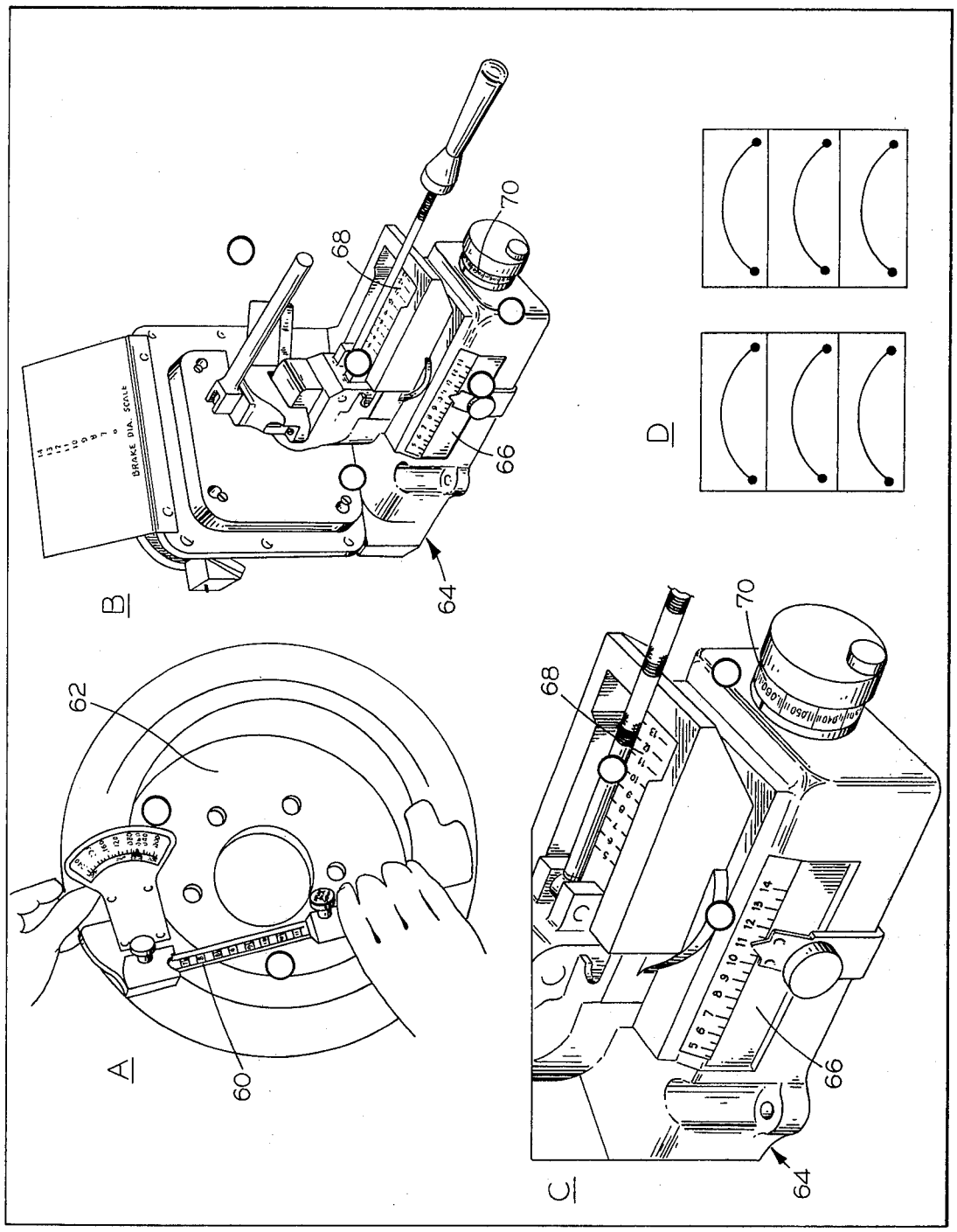
FIG. 4 is another illustration of a visual display of an environment including a multiplicity of datum references intended for cooperation with an auditory environment.

Turning now to FIG. 4, there is illustrated an environment relating to a brake shoe burner and in which the subject is to be exposed to both a visual and an auditory environment. Subfigure A shows a radial micrometer 60 being used to read information from a brake drum 62; Subfigure B illustrates the brake shoe burner device generally designated by the numeral 64; Subfigure C enlarges the scales on the brake shoe burner device of Subfigure B; and Subfigure D shows sample arcs on the brake shoe.

An instruction is given to the subject to examine the reading of the radial micrometer 60 in Subfigure A and to indicate how he would use the readings in operating the brake shoe burner 64 of Subfigure B and C. In this example, the nominal diameter of the brake shoe 62 is 8.5 inches and the nominal undercut is 0.060 inch. The subject should appropriately react by reading the nominal diameter and using this reading to set the upper and lower scales 66, 68 of the burner shown in Subfigure B and C. Utilizing a stylus coupled to the computer processor, he draws a line from the appropriate reading on the micormeter 60 in Subfigure A to the appropriate scale 66, 68 of the brake shoe burner 64 in Subfigure C and specifically to the desired setting for each of the scales. Accordingly, he should set the setting on the two scales 66, 68 at 8.5 inches and the setting on the radial scale 70 at 0.060, which setting is already indicated. The movement of the stylus and the settings which he so establishes are recorded in computer memory. After completion of any additional instructions and action by the subject, the computer program then displays in the graphic environment of FIG. 4 the appropriate lines and settings which should have been drawn as well as the lines and settings drawn by the subject.

In this particular programmed instruction, the subject is provided with an auditory environment indicating the sound which prevails during the course of the burnishing of the brake shoe as he makes the adjustment to the appropriate dials. In this course of instruction, the subject is asked to indicate by the stylus on Subfigure D the shape of the arc that he believes prevails for the sound which exists during the grinding cycle. This information in turn is stored in the memory of the computer through the processing module and, following completion of the series of instructions, is displayed graphically in a reproduction of the datum reference of Subfigure D together with the graphic display of the correct configuration.

Figure 5:
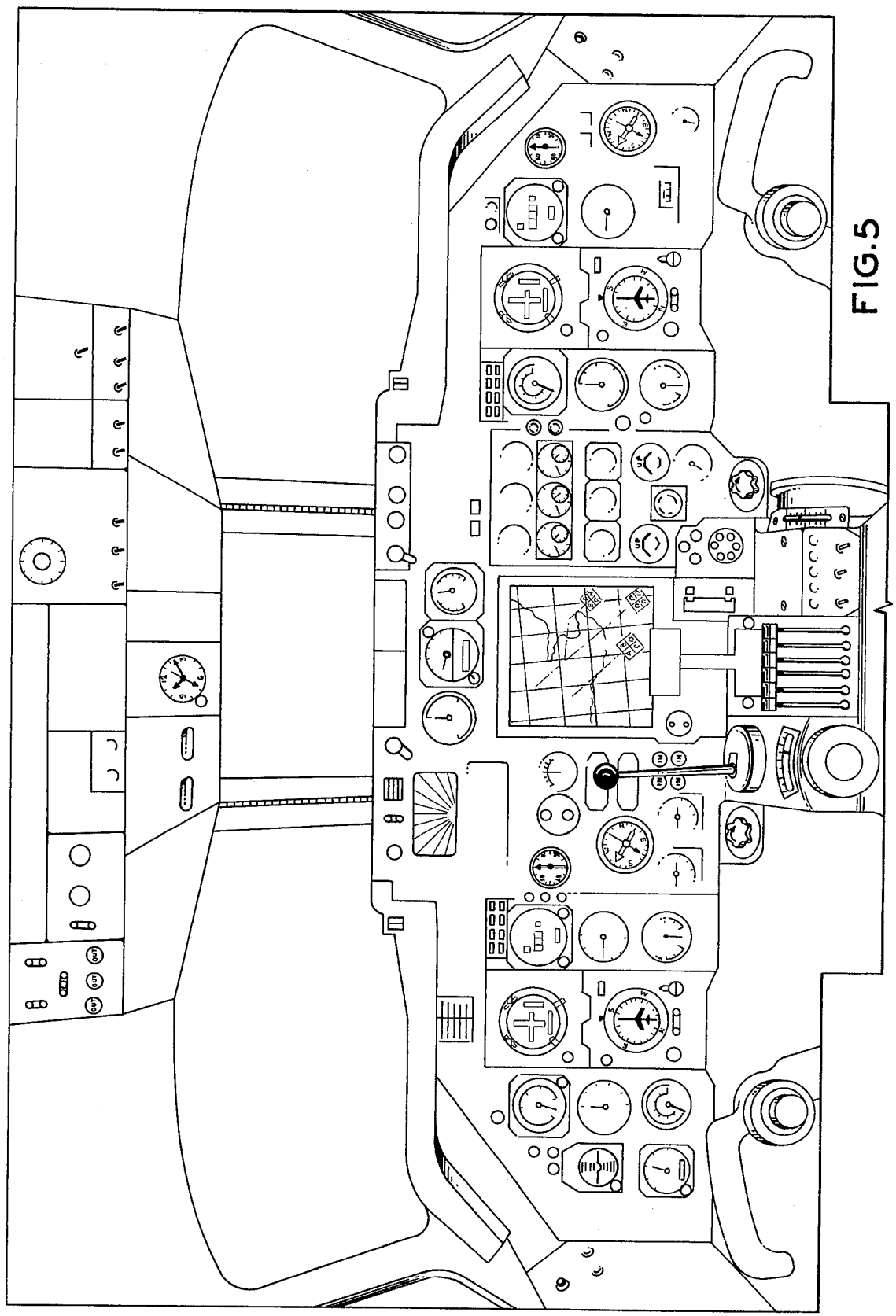
FIG. 5 is a fragmentary illustration of a visual display of an environment simulating the controls of a large jet aircraft.
Figure 5A:
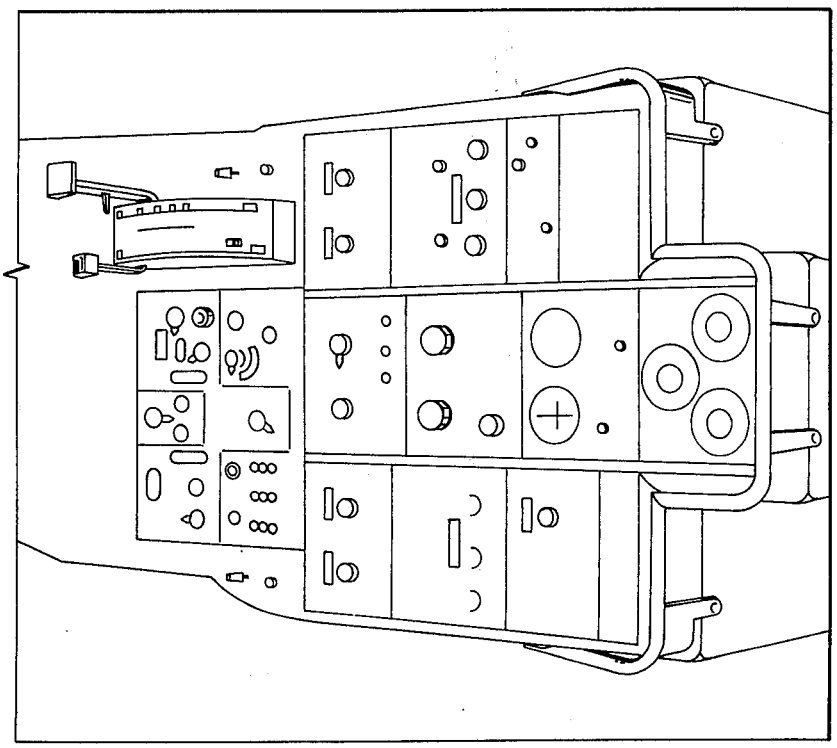
FIG. 5A is a continuation of the lower portion of the illustration of FIG. 5 to complete the visual display.

Turning now to FIG. 5, this environment may conveniently combine a multiplicity of stimuli, namely, graphic, numerical and auditory and may compare responses by the subject which are not only manipulative but also auditory. This program involves following through a course of check list actions during prestart of an aircraft, and involves a simulation of actions of the pilot and copilot going through the check list required prior to startup. The computer is programmed to provide a calling action and the subject is required to respond to the calling action with manipulation action or with manipulative action and verbal confirmation.

For example, the computer states "Check prime switch is at 'off'". The subject, utilizing a stylus, selects the prime switch and indicates the "off" position and thereafter responds verbally "prime switch off".

The computer then states "Check that autopilot ready indicator shows 'rdy'". The subject, using his stylus, locates the autopilot ready indicator and indicates with the stylus that "rdy" appears in the indicator window. After having done so, he then verbally states "Autopilot ready indicator at ready".

The computer then states "Engage autopilot". The subject, using his stylus, selects the azimuth and pitch levers and with the stylus indicates a forward movement of the levers and their release. He then selects the roll and pitch indicator and with the stylus shows that the flags contained therein should display "I" (abbreviation for "IN"). He then selects additional instruments with the stylus and with the stylus indicates the appropriate visual image that should be provided thereby. Having selected all of the appropriate instruments and made such appropriate changes to indicate that the autoplilot has been engaged, he completes the sequence by verbally stating "Autopilot engaged."

After completion of the series of instructions corresponding to the appropriate prestart check list, the computer then graphically, and in some instances audibly, presents for the subject a comparison of the actions which he has taken with respect to the datum reference of the visual image and a comparison of the appropriate verbal responses.

This embodiment is also of the type which lends itself to presentation of a visual environment which is in part dynamic and in part static. Through that portion of the visual image which would correspond to the windshield of the aircraft may be projected a dynamic or rapidly changing image of the topography or of flight or meteorological conditions around an aircraft. Similarly, the area navigation display or similar type control display panel may be changed dynamically while the bulk of the datum references in the environment remain essentially static.

As used herein, the term "visual display of an environment" is intended to include static visual images, dynamic visual images and images which are composites of static and dynamic visual images.

Thus, it can be seen from the foregoing specific examples of application of the method and apparatus of the present invention, that the mental imaging concepts of the aforementioned Conway U.S. Pat. No. 3,613,266 may be introduced into a dynamic environment, and more complex and rapid instructions and instructional sequences may also be employed. Moreover, through the use of computers, the quality of the mental image of the subject with respect to a datum reference may now be more readily subjected to quantitative analysis, and rapid assistance and instruction provided. The instructional programs which are developed may be varied readily as technology varies in the given environment so that instructional programs may be maintained current and adapted to meet changing situations.

Accordingly, the present invention provides a method and apparatus for enhancing an individual's capacity to develop mental images of data by rapid acting and variable electrical equipment for generating the desired visual environment, for recording the action of the subject to alter data within that environment and thereafter for presenting comparison images of the subject's action and the correct action. The method and apparatus conveniently may include an auditory environment and provide for concurrent verbal response, and the learning or training environment may be dynamic through utilization of relatively rapid alteration of the visual images for use by the subject.

Having thus described the invention, I claim:

1. In a method for developing an individual's capacity to form and utilize accurate mental images of data to which he has been previously exposed, the steps comprising:
   a. providing an electrically generated visual display of an environment simultaneously including a plurality of distinctive datum references within the displayed environment which may be acted upon by the subject and means for manipulation by the subject to electrically record his action to change any one of said distinctive datum references of said visual display;
   b. providing an instruction to the subject requiring an action with said manipulatable means to change at least said one of the datum references of said visual display;
   c. electrically recording invisibly to the subject his action in response to the instruction to change any one of said datum references of said visual display; and
   d. subsequently presenting to the subject for comparison an electrically generated visual display of said displayed of said displayed environment including said datum references of said visual display as changed by the correct response to said instruction and that change to said any one datum reference of said displayed environment effected by said electrically recorded action of the subject.

2. The method in accordance with claim 1 wherein said electrically generated visual display comprises an electronic display upon a cathode ray tube.

3. The mehtod in accordance with claim 1 wherein said electrically generated visual display comprises a photographic projection upon a screen.

4. The method in accordance with claim 2 wherein said means for manipulation by the subject comprises a light pen cooperating with said cathode ray tube.

5. The method in accordance with claim 1 wherein said manipulatable means comprises electrically operable means including a tablet and signal generating stylus means cooperating with said tablet.

6. The method in accordance with claim 1 wherein said manipulatable means comprises a physically movable device simulating an operating instrument in said environment.

7. The method in accordance with claim 1 wherein said manipulatable means comprises a keyboard for operation by the subject.

8. The method in accordance with claim 1 wherein there is additionally provided an auditory environment corresponding to that of said visual display.

9. The method in accordance with claim 8 wherein said action of the subject in response to the instruction effects an alteration of said auditory environment.

10. The method in accordance with claim 1 wherein said visual display is varied concurrently with the action of the subject using said manipulatable means.

11. The method in accordance with claim 10 wherein said concurrent variation is accompanied by a further instruction requiring a further action by the subject using said manipulatable means to change at least one of the datum references of said visual display and wherein the further action is also electrically recorded invisibly to the subject and thereafter the change effected by said further action by the subject is presented for comparison with a visual display including the datum reference as changed by the correct response to said further instruction.

12. The method in accordance with claim 1 including the additional steps of recording a multiplicity of visual displays of environments including datum references; selecting from the recorded visual displays that which is desired for presentation to the subject; and coupling said prerecorded visual display selected to means for electrically generating said visual display.

13. The method in accordance with claim 1 wherein said instruction is provided visually to the subject.

14. The method in accordance with claim 14 wherein said visual instruction comprises a change in the visual display requiring immediate action by the subject.

15. The method in accordance with claim 1 wherein said instruction is provided audibly to the subject.

16. The method in accordance with claim 1 wherein the action of the subject with said manipulatable means is recorded electronically.

17. The method in accordance with claim 1 wherein the action of the subject with said manipulatable means is recorded graphically.

18. The method in accordance with claim 1 wherein the comparison correct changed visual display and the visual image of the change effected by the subject are presented as side-by-side images.

19. The method in accordance with claim 1 wherein the comparison correct changed visual display and the visual image of the change effected by the subject are superposed.

20. The method in accordance with claim 19 wherein one of the images exhibits a different coloration for the changed datum reference from that of the other image.

21. The method in accordance with claim 1 wherein there is presented for comparison concurrently with the visual display comparison an auditory environment corresponding thereto.

22. The method in accordance with claim 1 wherein there is included the additional steps of recording a multiplicity of visual displays of environments including datum references; storing in the memory of computer means data relative to said multiplicity of visual displays; selecting the recorded visual display desired for presentation to the subject; and coupling said computer means to said invisible recording means and to said visual display generating means; and wherein said action by the subject is electronically recorded in said computer means and said computer means presents upon the visual display generating means the comparison images of the correct action and of the action taken by the subject.

23. Mental image enhancement apparatus comprising:
 a. means for electrically generating a visual display of an environment simultaneously including a plurality of distinctive datum references which may be acted upon by the subject;
 b. means for manipulation by a subject to electrically record an action taken by him to change any one of the datum references of the visually displayed environment;
 c. means for electrically recording invisibly to the subject his action using said manipulatable means to change any one of said datum references of the visual display; and
 d. means for subsequently presenting to the subject for comparison an electrically generated visual display of the environment including the datum references of said visually displayed environment as changed by the correct response to an instruction and that change to the datum references of said visually displayed environment effected by the electrically recorded action of the subject.

24. The apparatus in accordance with claim 23 wherein said means for electrically generating a visual display includes a cathode ray tube upon which the visual display is presented.

25. The apparatus in accordance with claim 23 wherein said means for electrically generating a visual display includes a photographic projector and screen upon which an image is photographically projected.

26. The apparatus in accordance with claim 24 wherein said means manipulatable by the subject comprises a light pen cooperating with said cathode ray tube and said invisible recording means.

27. The apparatus in accordance with claim 23 wherein said manipulatable means comprises a physically movable device simulating an operating instrument in the environment visually displayed.

28. The apparatus in accordance with claim 23 wherein said manipulatable means comprises a keyboard for operation by the subject.

29. The apparatus in accordance with claim 23 wherein there is included means for generating an auditory environment corresponding to the environment of the visual display generated by said visual display generating means.

30. The apparatus in accordance with claim 29 wherein said auditory environment generating means is affected by action of the subject using said manipulatable means to effect a change in the auditory environment.

31. The apparatus in accordance with claim 23 wherein said manipulatable means concurrently varies the visual display generated by said visual display means.

32. The apparatus in accordance with claim 23 including electronic recording means containing a multiplicity of electronic recordings of visual displays of environments; means for selecting from said electronic recording means a visual display record; and means coupling said electronic recording means with said visual display generating means to generate the selected visual display on said display means.

33. The apparatus in accordance with claim 23 wherein said electrical recording means produces a graphic record.

34. The apparatus in accordance with claim 23 wherein said electrical recording means produces an electronic record.

35. The apparatus in accordance with claim 23 wherein said comparison presentation means presents the comparison correct changed visual display and the visual image of the change effected by the subject as superposed images.

36. The apparatus in accordance with claim 23 wherein said comparison presentation means presents the comparison correct changed visual display and the visual image of the change effected by the subject as side-by-side images.

37. The apparatus in accordance with claim 23 further comprising a display processor having stored therein a multiplicity of visual displays of environments including datum references; computer means having electronicially stored therein data relative to said multiplicity of visual displays; means for selecting from said computer means the data for a visual display desired for presentation to the subject; means coupling said computer means to said visual display generating means; and wherein said manipulatable means is coupled to said computer means and the action of the subject using said manipulatable means is recorded electronically in said computer means; and wherein said computer means provides upon said visual display generating means the comparison images provided by electronically recorded data concerning the correct response and the data recorded from the subject's response.

* * * * *

UNITED STATES PATENT AND TRADEMARK OFFICE
CERTIFICATE OF CORRECTION

PATENT NO. : 4,060,915

DATED : December 6, 1977

INVENTOR(S) : MALCOLM J. CONWAY

It is certified that error appears in the above-identified patent and that said Letters Patent are hereby corrected as shown below:

Column 9, lines 51-52, "of said displayed" is repeated; second occurrence should be deleted.

Column 10, line 39, "with Claim 14" should be "with Claim 13".

Signed and Sealed this

Twenty-third Day of May 1978

[SEAL]

Attest:

RUTH C. MASON
*Attesting Officer*

LUTRELLE F. PARKER
*Acting Commissioner of Patents and Trademarks*